(No Model.)

G. D. MUNSING.
DRIVING WHEEL.

No. 500,669. Patented July 4, 1893.

Witnesses
F. S. Lyon
G. E. Purple

Inventor
George D. Munsing,
By Paul & Sherwin,
Attys.

UNITED STATES PATENT OFFICE.

GEORGE D. MUNSING, OF MINNEAPOLIS, MINNESOTA.

DRIVING-WHEEL.

SPECIFICATION forming part of Letters Patent No. 500,669, dated July 4, 1893.

Application filed December 6, 1892. Serial No. 454,226. (No model.)

*To all whom it may concern:*

Be it known that I, GEORGE D. MUNSING, of Minneapolis, in the county of Hennepin, State of Minnesota, have invented certain Improvements in Driving-Wheels for Machinery, of which the following is a specification.

My invention relates to improvements in friction driving wheels for which Letters Patent of the United States were granted to me May 27, 1890, No. 428,728 and consists generally in the construction and combination hereinafter described and particularly pointed out in the claims.

My invention will be more readily understood by reference to the accompanying drawings, in which—

Figure 1:
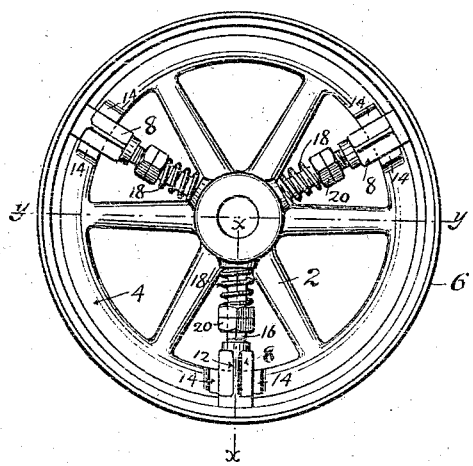
Figure 2:
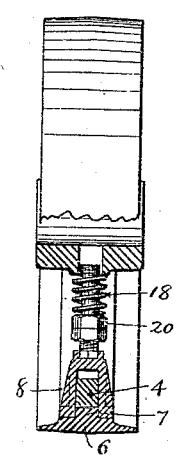
Figure 3:
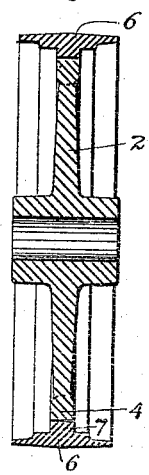
Figure 4:
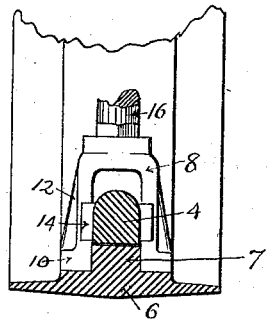

Figure 1 is a side elevation of a pulley embodying my improvement. Fig. 2 is an elevation and partial vertical section taken on the line $x-x$ of Fig. 1. Fig. 3 is a cross section through the arms of the pulley taken on the line $y-y$ of Fig. 1. Fig. 4 is an enlarged section of a portion of the rim to more clearly show the friction block.

In the drawings, 2 represents the body of the wheel or spider comprising the hub and spokes surrounded by the fixed rim 4.

6 represents the rim or slipping tire of the pulley, the outer surface of which receives the belt. The inner surface of this rim is preferably provided with the annular and central rib of substantially the same width as the fixed rim 4.

8 are friction blocks preferably U-shaped and extending over the fixed rim 4 and embracing the rib 7 upon the rim 6. The bearing faces on these blocks may be enlarged by suitable flanges 10, as shown in Fig. 4, when a larger frictional or wearing surface is required. Braces 12 preferably extend from these flanges to the upper portion of the block. Lugs or projections 14 are preferably placed upon the fixed rim at either side of the friction blocks to hold said parts in place upon the fixed center while allowing them to slide radially and take up the wear.

16 represents screw bolts the outer ends of which are preferably squared and fitted into a recess in the ends of the friction blocks. The inner ends of the bolts are guided and held in the hub as shown. Spiral springs 18 surround these bolts. The inner ends of the said springs rest upon the hub of the pulley and the other ends are controlled by the nuts 20 upon the screw bolts. The friction between the blocks 8 and the rim is regulated by a greater or less compression of the springs 18 by means of the nuts 20. By this action the friction blocks are forced outward against the inner surface of the rim until the desired amount of friction is obtained. The nuts 20 are then jammed or locked together and the pressure maintained. The wheel will thus be adjusted to a constant friction, giving a certain amount of belt pull. Anything beyond this amount will cause the rim to revolve upon the friction blocks.

Having thus described my invention, I claim as new and desire to secure by Letters Patent—

1. In a driving pulley, the combination, with a fixed center, of a loose outer rim arranged thereon, a series of friction blocks arranged upon said fixed center and embracing the inner portion of said rim, and a series of adjustable springs actuating said blocks, substantially as described.

2. In a driving pulley, the combination, with the fixed center having the narrow fixed rim 4, of the loose rim provided with the rib 7 of substantially the same width as the fixed rim 4, the friction blocks embracing said fixed rim and the rib 7, and adjustable springs actuating said blocks, substantially as described.

3. In a driving wheel, the combination, with a fixed center, of a loose outer rim free to revolve thereon, a projecting rib on the interior of said rim, friction blocks secured upon the fixed center and embracing said rib, and a series of adjustable springs actuating said blocks, substantially as described.

In testimony whereof I have hereunto set my hand this 3d day of December, 1892.

GEORGE D. MUNSING.

In presence of—
C. G. HAWLEY,
F. S. LYON.